Feb. 10, 1959

H. MÜLLER 2,872,737

LEVER GAGE ASSEMBLY

Filed June 14, 1956

INVENTOR
HANNS MÜLLER, by John B. Brady
ATTORNEY

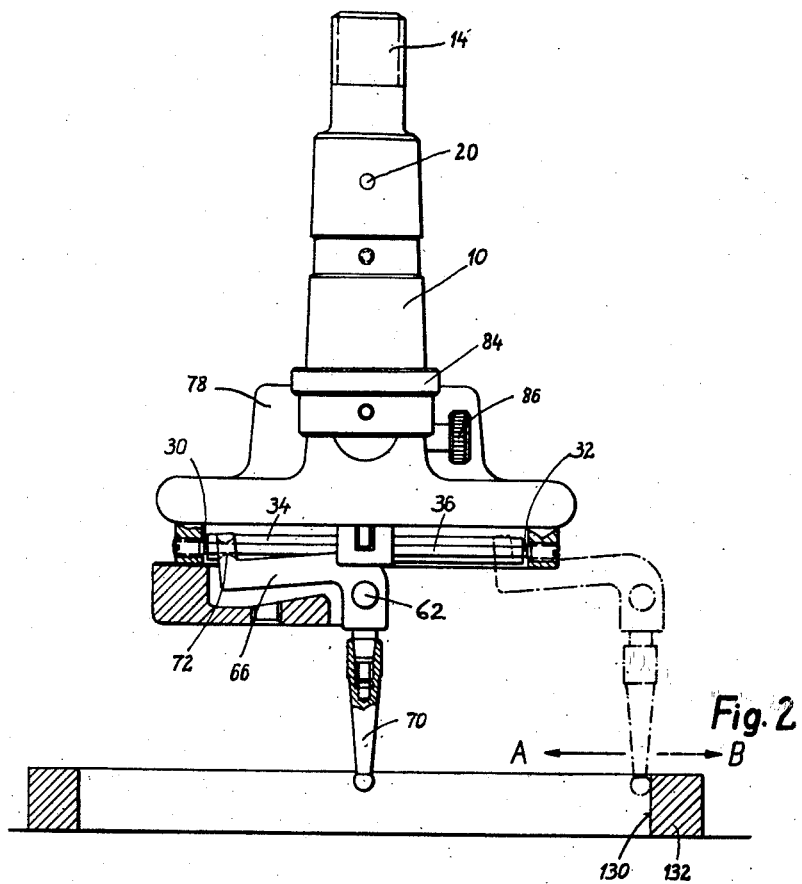

United States Patent Office 2,872,737
Patented Feb. 10, 1959

2,872,737

LEVER GAGE ASSEMBLY

Hanns Müller, Munich, Germany, assignor to Hans Deckel, Munich-Solln, Germany, and Friedrich Wilhelm Deckel, Zug, Switzerland Application June 14, 1956, Serial No. 591,342

Claims priority, application Germany June 23, 1955

5 Claims. (Cl. 33—172)

This invention is directed to a lever gage assembly consisting of a feeler lever, transmission rods and a dial gage, these parts being carried as a self-contained unit by a holder which can be inserted into a spindle and which is rotatable with the latter, where the feeler lever is displaceable in the direction transverse to the axis of rotation of the spindle and where an oblong member is arranged parallel to the direction of displacement of the lever gage, this member rotating about its longitudinal direction and being engaged by the feeler lever so that it can be longitudinally displaced.

The invention relates to a device where the deflection of the indicating member, for example the pointer of a dial gage, always takes place in the same direction, no matter whether the feeler lever is actuated during the measurements of inside or outside diameters in one or the other direction.

The continuous reading operation is accomplished, according to this invention, by the provision of scanning means at both sides of the swinging plate, which cooperate alternately with transmitting members of the transmission rods leading to the indicating member, depending on the direction of motion of the swinging plate, the indicating member being always actuated in the same direction, independent of the direction of motion of the swinging plate.

Other features of the invention will be understood from the following specification which describes one embodiment of the invention by reference to the accompanying drawings in which:

Fig. 2 is a side view of the assembly shown in Fig. 1; and

Figure 1:
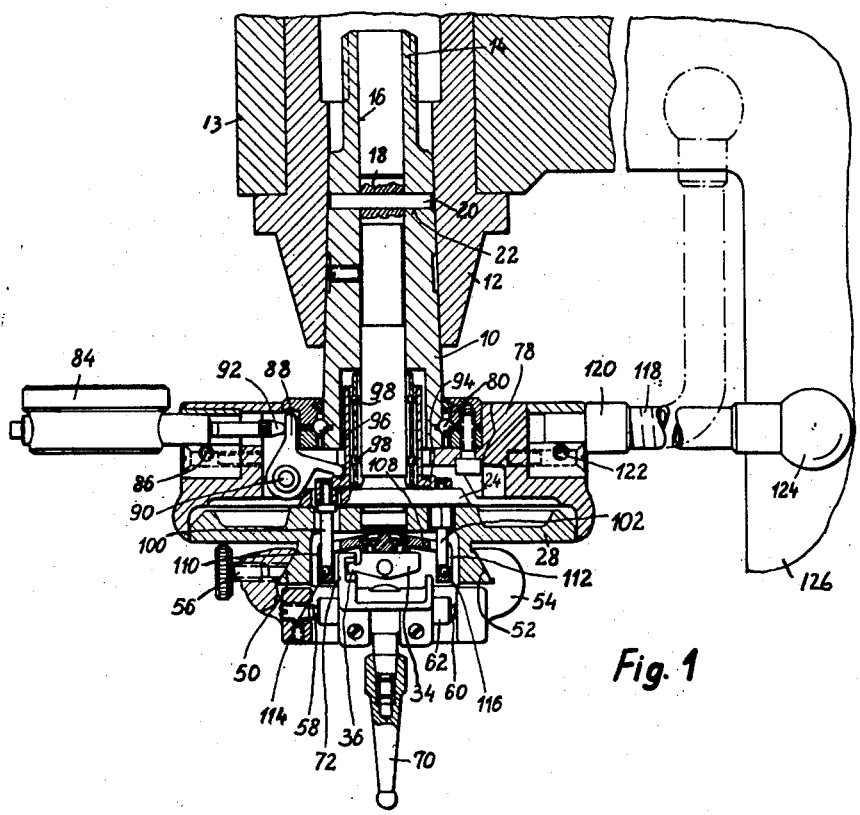
Figure 1 shows the structure of the invention applied to a lever gage, parts of the structure being shown in a longitudinal section.

The lever gage assembly is carried by a conical mandrel 10, which is inserted into the spindle 12 of the machine rotatably mounted in the machine frame 13. Said mandrel is clamped in said spindle in conventional manner by means not shown, cooperating with the screw part 14 of said mandrel 10. The conical mandrel 10 has an axial bore 16 in which is arranged a journal 18. The journal 18 is retained in position by means of a pin 20 arranged in a transverse bore 22 of the conical mandrel 10. The journal 18 has at its lower end a frontal flange 24 on which is secured by means of the screws 26 a hollow-capped bearing body 28, which participates in the rotating motions of the spindle 12 and of the conical mandrel 10 respectively.

In the bearing body 28 there is supported in the pivot point 30, 32, an oblong swinging member or plate 34 whose lineal side 36 is rounded off. On the outer longitudinal surfaces 50, 52 of the bearing body 28 is displaceably arranged, a slide 54 which can be adjustably secured by means of a clamping screw 56. A shaft 62 of a two-arm feeler lever 66, 70, is pivotally mounted between the pivot points 58, 60.

The arm 66 of the feeler lever has a crown-shaped mouth 72 which engages the rounded-off lineal side 36 of the swinging plate 34.

A carrier 78 is pivotally mounted on the conical mandrel 10 by means of a ball bearing 80. In the carrier 78 there is adjustably arranged the dial gage 84, disposed in a horizontal plane and having a calibrated scale 136 observable from a position adjacent the frame 13 of the machine, which is secured by a clamping screw 86 in the position which is most favorable for the respective reading. An angle lever 88, which is pivotally mounted on the journal 90 of the carrier 78, engages in turn an axially displaceable, spring-loaded feeler 92 of the dial gage 84 and, on the other hand, a flange 94 of a sleeve 96, which is axially displaceable by means of ball bearings 98 on the journal 18.

Figure 3:
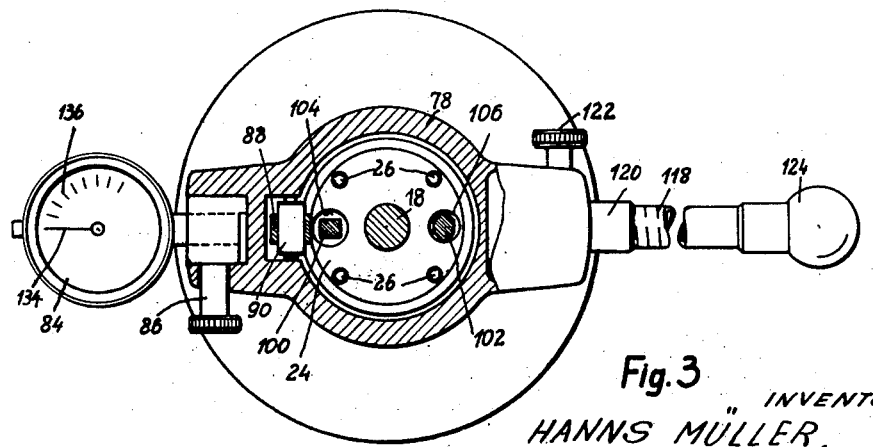
Fig. 3 is a top view of the assembly shown in Figs. 1 and 2.

The transmission of the motion from the swinging member or plate 34 to the sleeve 96 is effected by two transmission rods 100, 102 provided in the flange 94 of the sleeve 96 and extending parallel to the axial direction of the holder 10. Two apertures 104, 106 in the bearing body 28 permit the passage of the transmission rods 100, 102. The transmission rod 102 has a portion of such a cross section that it fits exactly into the aperture 106 (Fig. 3) with two of its bearing edges disposed in parallel relation to the axis of the transmission rod. This ensures the drive of the sleeve 96 with regard to the rotation of the journal 18, at the same time permitting a relative displaceability of the sleeve 96 with the transmission rods 100, 102 in axial direction with regard to the journal 18.

The swinging member or plate 34 carries, below the journal 18, a transverse, bridge-shaped part or member 108, which is secured to it. The ends of the bridge 108 are thus located at both sides of the swinging member or plate 34 and are provided with cuts 110, 112 in which are sunk ball supports 114, 116. These ball supports cooperate with the pin-like ends of the transmission rods 100, 102. When the swinging member or plate 34 is displaced in one or the other direction, one of the transmission rods 100, 102 is lifted by the displaced bridge 108 so that the sleeve 96 is moved axially. This deflection is transmitted over the angle lever 88 to the dial gage 84 where it is read as a pointer deflection.

To permit the carrier 78 to be stopped in the most favorable position for reading the dial gage 84, during the rotations of the feeler lever 66, 70 of the bearing body 28, necessary for the measurements, the following arrangement has been provided:

A flexible accordian tube 118 is inserted with its end 120 into the carrier 78 and tightened with a clamping screw 122. At the other end the accordian tube 118 is provided with a spherical knob 124 which abuts by corresponding bending of the accordian tube, on a suitable fixed support, for example on one side of the spindle socket 126. The inner rigidity of the accordian tube 118 is so great that it absorbs easily the frictional forces between the rotating parts 10, 18, 28 and the fixed carrier 78, so that this carrier together with the dial gage is retained in the most favorable reading position.

The assembly of my invention operates in the following manner:

If the central position of a bore 130 (Fig. 2) of the workpiece 132 with respect to the axis of the spindle 12 (Fig. 1) is to be tested, for example, according to Fig. 2, the slide 54 (Fig. 1) is first moved in the guide 50, 52 until the scanning point 70 of the feeler lever abuts on the wall of the bore 130, as it is indicated by the broken line in Fig. 2. By means of the clamping screw 56 (Fig. 1) the slide 54 is now clamped in the adjusted position. If the spindle 12, together with its subordinated parts 10, 28, 34 and 54, is put in rotation, the lever gage 70 scans the bore 130 and undergoes a deflection, for example, in the direction of the arrow A in Fig. 2. This deflection is transmitted over the arm 66 of the feeler lever to the swinging member or plate 34, and its bridge 108, and these parts perform a slight clockwise swinging motion according to Fig. 1. This swinging motion is imparted over the angle lever 88 to the dial gage 84, 92 where a clockwise deflection of the pointer 134 (Fig. 3) of the dial gage can be read in conventional manner according to Fig. 2. On the basis of the data on the dial gage, the workpiece 132 can be aligned in conventional manner with its bore 130 aligned with the axis of the spindle 12.

If, in other measurements, the feeler lever 70 is deflected in the opposite direction, as indicated by the arrow B in Fig. 2, for example, when testing outside diameters of another testing piece, the swinging member or plate 34 is displaced in the other direction, that is, counter-clockwise. In this case the motion is transmitted by the transmission rod 102 to the flange 94 of the sleeve 96 and imparted to the latter as an axial stroke. The deflection of the pointer of the dial gage thus takes place in the same direction as in the first case though the feeler was deflected in the opposite direction. The dial gage 84 therefore needs only a single scale 136 for its pointer 134.

In the above described example the transmission of the motion of the swinging member or plate 34 to the dial gage 84 by the actuation of the feeler lever 66, is effected by means of transmission rods 100—102 according to the invention so that the pointer 134 of the dial gage 84 is always deflected in the same direction, independent of the direction of motion of the feeler lever 66, so that the transmission rods 100—102 work in the same manner as a mechanical motion rectifier, that is, any motion of the swinging member or plate 34, whether clockwise or counter-clockwise, is transformed into a unidirectional motion of the dial gage 84. If the transmission rods 100—102 are designed symmetrically as in the example, equal deflections of the feeler lever 66 in one or the other direction will correspond to equal deflections of the dial gage 84.

Since the transmission ratio in the relative displacement of the feeler lever 70 along the swinging member or plate 34, necessary for the adjustment, was not changed in any way, and since, due to the above-described arrangements, the deflections of the dial gage 84 always takes place in the same direction, the device according to the invention meets the requirements for a device capable of a simple and accurate reading of the measuring data and which is easy to operate.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A lever gage assembly insertable into a rotary spindle, comprising a rotary shaft carried by said spindle, a non-rotary stationary part in which said shaft is rotatably mounted and which carries a dial gage, a swinging feeler lever associated with said shaft, the bearing for swinging said feeler lever being transversely displaceable with respect to the axis of rotation of said shaft, motion transmitting means for transmitting movement from the feeler lever to the dial gage mounted on said stationary part, comprising an oblong swinging plate pivotally mounted parallel to the direction of displacement of the feeler lever said plate being rotatable around its longitudinal axis, the feeler lever being disposed in engagement with one longitudinal side of said swinging plate, a bridge-shaped member having a pair of spaced arm, and a pair of transmission members separately engaging the arms of said bridge-shaped member for transmitting movements from said feeler lever to said dial gage, each transmission member being associated with one arm of the bridge-shaped member and extended in the same direction whereby either the one transmission member or the other transmits the movement from the bridge-shaped member to the dial gage according to whether the feeler lever is swung away from the zero-position in the one direction or in the other.

2. A lever gage assembly as set forth in claim 1, wherein the bridge-shaped member is rigidly connected with said swinging plate.

3. A lever gage assembly insertable into the rotary spindle of a driving shaft, comprising a rotary shaft carried by the spindle, a non-rotary stationary part in which the shaft is rotatably mounted and which carries a dial gage, a swinging feeler lever associated with said shaft, a bearing for said feeler lever transversely displaceable with respect to the axis of rotation thereof, a swinging plate extending parallel to the direction of displacement of the feeler lever and rotatable around its longitudinal axis, said feeler lever being disposed in engagement with the one longitudinal side of the swinging plate, a bridge-shaped member rigidly connected with said swinging plate, said bridge-shaped member terminating in a pair of arms, an axially displaceable bushing rotatable with said shaft, a pair of transmission rods associated with said axially displaceable bushing simultaneously rotatable with the rotation of said shaft, each transmission rod being associated with one arm of the bridge-shaped member and extending in the same direction whereby either the one or the other of said transmission rods transmits the movement from the bridge-shaped member to the bushing, according to whether the feeler lever is swung away from zero-position either in one direction or in the other, and means for transmitting movement from said rotary axially displaceable bushing to said dial gage mounted on the stationary part.

4. A lever gage assembly as set forth in claim 3 which additionally comprises ball supports between the ends of the transmission rods and the arms of the bridge-shaped member.

5. A lever gage assembly insertable into the rotary spindle of a driving shaft, comprising a rotary shaft carried by the spindle, a non-rotary stationary part in which said shaft is rotatably mounted and which carries a dial gage, a swinging feeler lever associated with said shaft and displaceable in a direction transverse to the axis of rotation of the shaft, an elongated plate extending transversely of said assembly, means for pivotally mounting said plate for movement about its longitudinal axis, a connection between said feeler lever and one edge of said plate for orienting said plate about the longitudinal axis of the plate according to the displacement of said feeler lever, a bridge-like member mounted on said plate and having an arm depending downwardly at opposite sides thereof terminating in an upwardly directed socket, a ball carried in each of said sockets, a pair of transmission rods extending upwardly in a direction substantially parallel with said shaft and the arms of said bridge-like member, said rods terminating at their lower ends in engagement with said balls and means interconnecting the upper ends of said rods and said dial gage for operating said dial gage in accordance with the movement transmitted from said feeler lever through said plate, said bridge-like member, and said transmission rods.

References Cited in the file of this patent

UNITED STATES PATENTS

| | | |
|---|---|---|
| 1,241,469 | Payne | Sept. 25, 1917 |
| 1,399,314 | Nicholson | Dec. 6, 1921 |
| 1,723,529 | Schwieterman | Aug. 6, 1929 |